United States Patent [19]
Atkins et al.

[11] 4,172,059
[45] Oct. 23, 1979

[54] LOW SHRINKING THERMOSETTING MOLDING COMPOSITIONS HAVING REDUCED INITIAL VISCOSITY

[75] Inventors: Kenneth E. Atkins, South Charleston; Raymond C. Gandy, St. Albans, both of W. Va.

[73] Assignee: Union Carbide Corporation, New York, N.Y.

[21] Appl. No.: 876,087

[22] Filed: Feb. 8, 1978

[51] Int. Cl.$^2$ .................... C08G 63/16; C08G 63/48; C08G 63/76
[52] U.S. Cl. .................... 260/22 CB; 260/22 T; 260/23 P; 260/40 R
[58] Field of Search ............ 260/22 T, 22 CB, 22 A, 260/23 P

[56] References Cited
U.S. PATENT DOCUMENTS

| | | | |
|---|---|---|---|
| 2,418,633 | 4/1947 | Gould | 260/22 T |
| 3,219,604 | 11/1965 | Fischer | 260/22 T |
| 3,390,205 | 6/1968 | Schnell et al. | 260/22 A |
| 3,466,259 | 9/1969 | Jernigan | 260/37 R |
| 3,549,586 | 12/1970 | Smith et al. | 260/40 R |
| 3,668,178 | 6/1972 | Comstock et al. | 260/40 R |
| 3,701,748 | 10/1972 | Kroekel | 260/40 R |
| 3,718,714 | 2/1973 | Comstock et al. | 260/862 |
| 3,887,515 | 6/1975 | Pennington et al. | 260/40 R |
| 3,988,388 | 10/1976 | Alberts et al. | 260/862 |

OTHER PUBLICATIONS

Bjorksten, Polyesters and Their Applications, Reinhold Publishing Corporation, N.Y., N.Y., 1956, pp. 161, 322 & 323.

Primary Examiner—Ronald W. Griffin
Attorney, Agent, or Firm—Franklyn Scheonberg

[57] ABSTRACT

There is disclosed thickened, low shrink curable molding compositions having reduced initial viscosity and the method of making the same. The low shrink, curable thermosetting compositions have a thermoplastic low profile additive and viscosity reducing agent incorporated therein, said thermoplastic low profile additive being a vinyl acetate polymer, a saturated polyester or mixtures thereof and said viscosity reducing agent being an aliphatic monocarboxylic acid having at least 6 carbon atoms in the chain.

18 Claims, No Drawings

LOW SHRINKING THERMOSETTING MOLDING COMPOSITIONS HAVING REDUCED INITIAL VISCOSITY

The present invention relates to low shrink thermosetting resin molding compositions and more particularly to curable low shrink unsaturated polyester molding compositions which have reduced initial viscosity and to the method of making the same.

A major advance in commercial thermosetting molding technology was the introduction several years ago of chemically thickened systems. Chemical thickening is always employed in sheet molding compounds ("SMC"), and is increasingly being used in bulk molding compounds ("BMC"). In such systems, an alkaline material such as magnesium oxide or magnesium hydroxide is added to, for example, an uncured polyester along with fillers, glass fiber, and other standard materials. The alkaline material interacts with residual acidity in the polyester to build viscosity. The thickened system is relatively tack-free and easy to handle, and the high viscosity carries the glass fiber reinforcement to the extremities of the mold during crosslinking of the system. Thus, the use of thickened systems has made a major contribution to the commercial expansion of polyester molding.

Another technical improvement that has made a significant contribution to commercial thermosetting molding technology is the use of low profile additives to reduce shrinkage during the curing reaction, and to thereby improve dimensional stability and surface smoothness. Low profile additives are, in general, thermoplastic polymers such as vinyl acetate polymers, polystyrene, acrylic polymers, and polycaprolactones. There are a number of theories that seek to explain the low profile or anti-shrinkage action of these polymers, but the one that seems to best explain the phenomenon is the following:

The low profile additive is at least partly soluble in the uncured thermosetting resin such as a polyester/styrene solution. As the polyester/styrene mixture crosslinks, the thermoplastic polymer becomes incompatible or less soluble and at least partly comes out of solution. This action causes a volume expansion that compensates for the shrinkage that occurs when the polyester/styrene mixture crosslinks.

When a low profile additive is employed in a thickened composition, the increase of viscosity that occurs can cause the low profile additive to separate, and thereby cause a tacky surface. This problem is usually most severe with the more reactive polyesters, i.e., those having lower molecular weight to double bond ratios. To combat this, carboxylic acid functionality is incorporated in the low profile additive. The thermoplastic polymer itself can then enter the thickening reaction, thereby ensuring that a tack-free surface will result.

However, while alleviating the tackiness problem the introduction of these carboxyls into the thermoplastic can present other difficulties if not properly understood. For the thermoplastics to function optimally as shrinkage control agents they must become incompatible with the crosslinked thermosetting resin structure. Therefore, if a polyester resin, carboxylated thermoplastic and thickening agent structure are not carefully controlled and balanced, the chemical thickening agent can bond the thermoplastic in the thermoset system through the carboxyl groups. This will reduce the amount of thermoplastic-thermoset incompatibility, thus reducing, and in extreme cases, actually eliminating the shrinkage control.

Another property of these composites which can be notably effected by this thickening process is the rate and extent to which the viscosity is increased during the compounding stage. The increase in viscosity that occurs can result in mechanical handling problems, poor wet-out of the reinforcing fibers, and, in many cases, limit the amount of fillers and reinforcing fibers that can be incorporated therein. Higher filler loadings are desirable both from the ultimate properties imparted to the molded part and from an economic standpoint. By careful formulation, and with the use of certain thickening agents and commercially available low profile additives, it is possible to balance adequate shrinkage control and dimensional stability with adequate compound viscosity, fiber wet-out, and molding characteristics. However, truly low shrink, thickened thermosetting resin composites, with the variety of resin and filler combinations and ratios that may be desired for different applications, have not been prepared and development of means for readily and simply controlling compound viscosity would be highly desirable.

In accordance with the present invention, there is provided means for making low shrink chemically thickened curable molding compositions having reduced initial viscosity. In one aspect, the invention provides a curable composition of a mixture of a thermosetting resin which is an unsaturated polyester resin, a terminally unsaturated vinyl ester resin or mixtures thereof, an olefinically unsaturated copolymerizable monomer, a chemical thickening agent, and a filler, said curable composition comprising a viscosity reducing agent which is an aliphatic monocarboxylic acid having at least 6 carbon atoms and a thermoplactic polymeric low profile additive selected from the group consisting of vinyl acetate polymers, saturated polyesters, such as polycaprolactone, and mixtures thereof, said viscosity reducing agent being present in an amount of at least about 0.4 percent by weight based on the combined weight of thermosetting resin, copolymerizable monomer, and low profile additive.

In another aspect, the invention provides a curable composition of a mixture of a thermosetting resin which is an unsaturated polyester resin, a terminally unsaturated vinyl ester resin or mixtures thereof, an olefinically unsaturated copolymerizable monomer, a chemical thickening agent and a filler, said curable composition comprising a viscosity reducing agent which is an unsaturated aliphatic monocarboxylic acid having at least 6 carbon atoms and a polymethyl methacrylate polymer low profile additive, said viscosity reducing agent being present in an amount of at least about 0.4 percent by weight based on the combined weight of thermosetting resin, copolymerizable monomer and low profile additive.

Also provided in accordance with the invention is a method for making low shrink, curable molding compositions having reduced initial viscosity from a mixture comprising a thermosetting resin which is an unsaturated polyester resin, a terminally unsaturated vinyl ester resin, or mixtures thereof, an olefinically unsaturated copolymerizable monomer, a chemical thickening agent, and a filler, said process comprising incorporating in said resin mixture a thermoplastic, polymeric low profile additive selected from the group consisting of vinylacetate polymers, saturated polyesters such as polycaprolactone, and mixtures thereof, and a viscosity reducing agent comprising an aliphatic monocarboxylic acid having at least 6 carbon atoms in an amount of at least about 0.4 percent by weight based on the combined weight of thermosetting resin, copolymerizable monomer, and low profile additive.

Thermosetting resins suitable for use in accordance with the invention are polyester resins that are reaction products of a dicarboxylic acid or anhydride, with a polyhydric alcohol. The dicarboxylic acids or anhydrides that are employed to produce the polyester, either singly or in combination, must include those that contain olefinic unsaturation, preferably wherein the olefinic unsaturation is alpha, beta- to at least one of the carboxylic acid groups. Such acids include maleic acid or anhydride, fumaric acid, tetrahydrophthalic acid or anhydride, hexachloroendomethylene tetrahydrophthalic anhydride ("chlorendic anhydride"), Diels-Alder adducts of maleic acid or anhydride with compounds having conjugated olefinic unsaturation, such adducts being exemplified by bicyclo[2.2.1]hept-5-en3-2,3-dicarboxylic anhydride, methyl maleic acid, and itaconic acid. Maleic acid or anhydride and fumaric acid are the most widely used commercially.

In addition to the olefinically unsaturated acid or anhydride, saturated and/or aromatic dicarboxylic acids or anhydrides can also be employed in producing the polyester. Such acids include phthalic acid or anhydride, terephthalic acid, hexahydrophthalic acid or anhydride, adipic acid, isophthalic acid, and "dimer" acid (i.e., dimerized fatty acids).

A polyol is also employed to produce the polyester. Such polyols include ethylene glycol, diethylene glycol, dipropylene glycol, butylene glycols, neopentyl glycol, glycerol and 1,1,1-trimethylolpropane. As a rule, not more than about 20 mole percent of the polyol will be a triol, with the remainder being one or more diols.

As is known in the art, polyesters that are employed in thickened molding compositions must contain residual acidity in order to enter into the thickening reaction. The nature and production of the polyesters used in such applications are known in the art.

Also suitable for use in the compositions of the invention are terminally unsaturated vinyl ester resins that are reaction products of about equivalent proportions of a polyepoxide resin and an unsaturated monocarboxylic acid wherein:

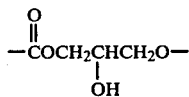

linkages are formed and the resulting resin has terminal, polymerizable unsaturated groups. For example, two equivalents of methacrylic acid may be reacted with two equivalents of a polyepoxide resin to produce a vinyl ester resin.

Vinyl ester resins that have been advantageously employed in both BMC and SMC are resins wherein the secondary hydroxyl group formed by the interaction of an epoxide group with a carboxylic acid group has been reacted with a dicarboxylic acid anhydride to produce pendant carboxylic acid groups. A variety of saturated and unsaturated anhydrides similar to those described as useful in preparing polyester resins may be used in proportions of at least about 0.1 mole of anhydride per equivalent of hydroxyl group up to an amount sufficient to react with each hydroxyl.

Thermosetting resins that are classified herein as vinyl ester resins, which contain the characteristic linkages and terminal, polymerizable unsaturated groups, are fully disclosed in U.S. Pat. No. 3,887,515 to Pennington et al along with the preparation of such resins and further description of these well known resins is unnecessary herein.

The curable compositions of the invention also contain a monomer that contains ethylenic unsaturation, and which is copolymerizable with the polyester and terminally unsaturated vinyl ester resins. Styrene is the preferred monomer in commercial practice today, although others can be used. Such others include, for example, vinyl toluene, methyl methacrylate, chlorostyrene, diallyl phthalate, and the like and mixtures thereof.

The said monomer is also employed in the resin composition for the purpose of dissolving the thermosetting resin (which is a solid at ambient temperatures, i.e., about 20°–25° C.) to ensure that the resin composition is a fluid. Enough monomer is employed so that the thickness or viscosity of the fluid is such that the fluid can be processed conveniently. Excessive amounts of the monomer are normally to be avoided, because such excess can have an adverse effect on properties. For instance, too much of the monomer may tend to cause embrittlement of the cured polyester. Within these guidelines, effective proportions of the monomer are normally found within the range of from about 25 to about 70, and preferably 40 to 55, weight percent, based on weight of thermosetting plus monomer, plus low profile additive.

A thickening agent is also employed in the compositions of the invention. Such materials are known in the art, and include the oxides and hydroxides of the metals of Group I, II and III of the Periodic Table. Illustrative examples of thickening agents include magnesium oxide, calcium oxide, calcium hydroxide, zinc oxide, barium oxide, magnesium hydroxide, and the like including mixtures of the same. Thickening agents are normally employed in proportions of from about 0.1 to about 6 weight percent, based upon weight of polyester resin, plus monomer, plus low profile additive.

Alternatively a dual thickening system may be employed wherein, for example, a metallic oxide or hydroxide and polyisocyanate in amounts of polyisocyanate sufficient to react with at least thirty percent of the hydroxyl groups but not more than one hundred and five percent of the hydroxyl groups present and an amount of metallic oxide or hydroxide sufficient to react with at least thirty percent of the carboxyl groups but not more than seventy-five percent of the carboxyl groups present. Reference is made to Belgium Patent No. 849,135 to Epel et al. for a description of such dual thickening systems.

An essential component of the compositions of the invention are thermoplastic low profile additives. In one aspect, the low profile additives that may be employed in the invention are thermoplastic polymers of vinyl acetate, saturated thermoplastic polyesters, and mixtures of the same. In another aspect of the invention, the low profile additive that may be employed are thermoplastic polyalkyl methacrylate polymers.

Suitable thermoplastic vinyl acetate polymer low profile additives are poly (vinyl acetate) homo-polymers and thermoplastic copolymers containing at least 50 weight percent vinyl acetate. Such polymers include, for example, vinyl acetate homopolymer; carboxylated vinyl acetate polymers including copolymers of vinyl acetate and ethyleneically unsaturated carboxylic acids, such as acrylic acid, methacrylic acid, maleic acid, fumaric acid, itaconic acid and the like or anhydrides such as maleic anhydride; vinyl acetate/vinyl chloride/maleic acid terpolymer and the like. Reference is made to U.S. Pat. No. 3,718,714 to Comstock et al., and British Pat. No. 1,361,841 to Comstock et al. for descriptions of some of the suitable vinyl acetate polymer low profile additives.

The useful vinyl acetate polymer low profile additives ordinarily have molecular weights within the range of from about 10,000 to about 250,000, and preferably from about 25,000 to about 175,000. They are usually employed in proportions of from about 5 to 25, and preferably from about 9 to 16, weight percent, based on weight of polyester plus low profile additive, plus monomer.

Suitable thermoplastic saturated polyester low profile additives are, in general, low molecular weight saturated polymers of polymerizable linear and/or cyclic esters and carboxylated saturated polymers of said polymerizable esters having at least one carboxyl group per molecule.

Polymers of linear and/or cyclic esters, including carboxylated polymers having an average of at least one carboxyl group per molecule which may be used in accordance with the present invention are those which possess a reduced viscosity of at least about 0.1, and preferably from about 0.15 to about 15 and higher. The preferred polymers of cyclic esters have a reduced viscosity of about 0.2 to about 10.

Suitable polymers are further characterized by the following basic recurring structural Unit I

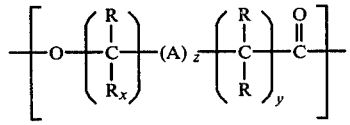

wherein each R, which can be the same or different, is hydrogen, halogen, i.e. chlorine, bromine, iodine, or fluorine or a monovalent hydrocarbon radical generally containing a maximum of 12 carbon atoms, and preferably containing a maximum of eight carbon atoms. A is an oxy group; x is an integer having a value of 1 to 4 inclusive, y is an integer having a value of 1 to 4 inclusive, z is an integer having a value of 0 or 1, with the proviso that (a) the sum of $x+y+z$ is 4 to 6 inclusive and (b) the total number of R variables which are substituents other than hydrogen does not exceed 2.

Illustrative of suitable monovalent hydrocarbon radicals for R are the following: alkyl radicals such as methyl, ethyl, isopropyl, n-butyl, sec-butyl, t-butyl, n-hexyl, 2-ethylhexyl, n-dodecyl, chloroethyl, chloropropyl and the like; alkoxy radicals such as methoxy, ethoxy, n-propoxy, n-hexoxy, n-dodecoxy and the like; aryl radicals such as phenyl, ethyl phenyl, n-propylphenyl, n-butylphenyl and the like; aryloxy radicals such as phenoxy, n-propylphenoxy, n-butylphenoxy and the like; cycloaliphatic radicals such as cyclopentyl, cyclohexyl and the like.

In one embodiment, desirable polymers of cyclic esters are characterized by both basic recurring structural Unit I supra and basic recurring structural Unit II, as are obtained from a mixture containing a cyclic ester and a cyclic monomer such as ethylene oxide, propylene oxide and the like.

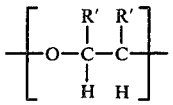

wherein each R', is as defined for R of Unit I, or in which the two R' variables together with the ethylene moiety of the oxyethylene chain of Unit II form a saturated cycloaliphatic hydrocarbon ring having from four to eight carbon atoms inclusive. It is preferred that recurring Unit II contains from two to twelve carbon atoms inclusive. The interconnection of Unit I and Unit II does not involve or result in the direct bonding of two oxy groups i.e., —O—O—.

Particularly preferred polymers of cyclic esters are those which are characterized by the oxypentamethylenecarbonyl chain as seen in basic recurring structural Unit III

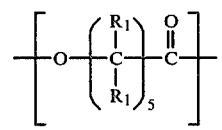

wherein each $R_1$ is hydrogen or lower alkyl, that is alkyl having a maximum of 4 carbon atoms, with the proviso that no more than three $R_1$ variables are substituents other than hydrogen.

Thermoplastic saturated polymers of linear and/or cyclic esters are well known and the carboxylated saturated esters are well known and such thermoplastic saturated polymers, and particularly polymers prepared from epsilon-caprolactones, have been advantageously employed as low profile additives. Reference, for example, is made to U.S. Pat. Nos. 3,549,586 and 3,668,178 to Comstock et al. for descriptions of thermoplastic saturated polyester low profile additives and carboxylated thermoplastic saturated polyester low profile additives prepared from cyclic esters.

The thermoplastic saturated polyester low profile additives may usually be employed in the compositions of the invention in proportions similar to those of thermoplastic vinyl acetate polymers, i.e., in proportions from about 5 to 25 weight percent, and preferably from about 10 to 20 weight percent, based on the weight of polyester, plus low profile additive, plus monomer.

Also suitable in certain aspects of the invention are thermoplastic polyalkyl acrylate or methacrylate low profile additives including, for example, homopolymers of methyl methacrylate, ethyl methacrylate, butyl methacrylate, methyl acrylate, ethyl acrylate; copolymers of methyl methacrylate and lower alkyl esters of acrylic and methacrylic acids, and copolymers of methyl methacrylate with minor amounts of one or more of the following: lauroyl methacrylate, isobornyl methacrylate, acrylamide, hydroxyethyl methacrylate, styrene, 2-ethylhexyl acrylate, acrylonitrile, methacrylic acid and the like.

Molecular weight of the alkyl acrylate or methacrylate polymers useful in the invention may vary over a wide range, from 10,000 to 10,000,000, and preferably from 25,000 to 500,000.

The thermoplastic polymer should be present in amounts ranging from 1 to 25 percent by weight, based on the weight of polyester, plus low profile additive, plus monomer, and preferably from 5 to 20 percent by weight.

Another essential component of the compositions of the invention is a viscosity reducing agent. In one aspect, the invention employs, generally in combination with thermplastic vinyl acetate polymer and thermoplastic saturated polyester low profile additives, a viscosity reducing agent which is an aliphatic monocarboxylic acid having at least 6 carbon atoms.

The aliphatic monocarboxylic acid employed usually has at least 6 carbon atoms in the chain, and is frequently a saturated or unsaturated fatty acid having from 6 to 24 or more carbon atoms in the chain. Such carboxylic acids may be caproic (hexanoic), caprylic (octanoic), capric ($C_{10}$), lauric ($C_{12}$), myristic ($C_{14}$), palmitic ($C_{16}$), palmitoleic ($C_{16}$), stearic ($C_{18}$), oleic ($C_{18}$), linoleic ($C_{18}$), linolenic ($C_{18}$), and the like acids, and the acids may be either straight chain or branched chain. Products in which mixtures of acids of the foregoing kind occur, such as tall oil acid, may be used.

The viscosity reducing agent should be present in amounts ranging from 0.4 to about 6 weight percent, and preferably from about 1 to 4 weight percent, based on the combined weight of thermosetting resin, copolymerizable monomer, and low profile additive.

In another aspect of the invention, and particularly when thermoplastic polyalkyl acrylate or methacrylate low profile additives are employed, a viscosity reducing agent which is an unsaturated aliphatic monocarboxylic acid having at least 6 carbon atoms in the chain is employed. Such aliphatic monocarboxylic acids are frequently an unsaturated fatty acid having from 6 to 24 or more carbon atoms in the chain including, for example, 9-dodeconic, 9-tetradeconic, palmitoleic ($C_{16}$), oleic ($C_{18}$), linoleic ($C_{18}$), linolenic ($C_{18}$), and the like acids, and the acid may be either straight chain or branched chain.

Such viscosity reducing agent should also be employed in amounts ranging from 0.4 to about 6 weight percent, and preferably from about 1 to 4 weight percent, based on the combined weight of thermosetting resin, copolymerizable monomer, and low profile additive.

The thermosetting molding composition of the invention may also contain one or more of the known types of conventional additives, which are employed for their known purposes. The following are illustrative of such additives:

1. Polymerizable initiators such as t-butyl hydroperoxide, t-butyl perbenzoate, benzoyl peroxide, and others known to the art. The polymerization initiator is employed in a catalytically effective amount, such as from about 0.3 to about 2 to 3 weight percent, based on the weight of thermosetting resin, plus monomer, plus low profile additive;

2. Fillers such as clay, hydrated alumina, silica, calcium carbonate and others known to the art. The proportions of such fillers employed in compositions of the invention may vary over a wide range depending on the products to be prepared therefrom but, in general, may range from about 25 to 200 or higher weight percent, and preferably from about 125 to 185 weight percent, based on the weight of termosetting resin, plus monomer, plus low profile additive;

3. Reinforcing fillers such as glass fibers or fabrics is most commonly used but other fibers may be used, including asbestos fibers or fabrics, various organic fibers or fabrics such as those made of polypropylene, acrylonitrile/vinyl chloride copolymer and the like; and 4. Mold release agents or lubricants, such as zinc stearate, calcium stearate, and others known to the art. It has been found that viscosity reducing agents employed according to the practice of the invention will also impart mold release characteristics to the composition. Replacement of all, or at least a portion of conventional mold release agents is thus, made possible.

The compositions of the invention can be prepared by mixing the components in a suitable apparatus such as a Hobart mixer, at temperatures on the order of about 20° C. to about 50° C. The components may be combined in any convenient order. Generally, it is preferable that the thermosetting resin and low profile additive are added in liquid form by preparing a solution thereof in styrene or other liquid copolymerizable monomer. All the liquid components are usually mixed together before adding the fillers and thickening agent. Incorporation of fillers, including reinforcing fibers such as chopped glass fibers, in BMC and SMC by the mixing means usually employed in producing such compositions is facilitated by employing viscosity reducing agents in accordance with the practice of the invention. Moreover, much greater flexibility is afforded in amount and type of fillers that may be used, and in better reinforcing fiber wet-out.

Once formulated, the compositions can be molded into thermoset articles of desired shape, particularly thermoset articles such as automobile fenders, dashboards and the like. The actual molding cycle will, of course, depend upon the exact composition being molded as well as upon the nature of particular cured product desired. Suitable molding cycles are conducted at temperatures on the order of about 100° C. to about 182° C. for periods of time ranging from about 0.5 minute to about 5 minutes.

The following examples further illustrate the present invention and are not intended to limit the scope thereof in any manner.

EXAMPLE 1

A series of SMC are prepared using the following proportion of ingredients:

| Component | Composition (Parts by weight) | | |
| --- | --- | --- | --- |
| | A | B | C |
| Polyester Resin | 39 | 39 | 39 |
| Low Profile Additive | 14 | 14 | 14 |
| Styrene | 47 | 47 | 47 |
| $CaCO_3$ | 180 | 180 | 180 |
| Zinc Stearate | 4 | 2 | 2 |
| Oleic Acid | — | 2 | 2 |
| MgO | 2.5 | 2.5 | 2.5 |
| t-butyl perbenzoate | 1.0 | 1.0 | 1.0 |
| Chopped Glass Fibers | 25.3 | 25.5 | 26.6 |

The polyester resin is the unsaturated reaction product of a mixture of maleic anhydride and isophthalic acid (approx. 3 to 1 molar ratio) and propylene glycol available commercially under the trademark designation STYPOL 40-2955 from Freeman Chemical Company as a 65 percent by weight resin solution in styrene.

The Low Profile Additive is a carboxylated poly(vinyl acetate) thermoplastic polymer, available commercially under the trademark designation BAKELITE Low Profile Additive LP-40A from Union Carbide Corporation as a 40 percent by weight resin solution in styrene.

Each of the compositions are prepared by adding weighed quantities of the liquid components into a 5 gallon, open top container and then mixing with a high speed type dissolver until completely mixed, a period of 2-3 minutes. The zinc stearate and/or oleic acid is then added to the liquid mixture and agitated until completely dispersed. The CaCO₃ filler is then added gradually with agitation until a consistent paste is obtained and the agitation is continued until a temperature of at least 90° F. (32° C.) is attained. The MgO thickener is added to the paste mixtue and mixed further for a period of about 2 to 3 minutes. After mixing is completed, a sample of about 175 grams is taken from the batch, placed in a capped bottle and stored at room temperature. The sample did not contain any glass fiber filler.

The viscosity of the sample is measured using a Brookfield Synchro-Lectric Viscometer, Model HBT 5X on a Helipath Stand using a TA spindle at 5 RPM. The viscosity determined for each of the compounds of this Example are summarized in Table I, below.

Table I

|  | Composition |  |  |
|---|---|---|---|
|  | A | B | C |
| Initial Viscosity (CPS | 83,200 | 46,400 | 40,000 |

The balance of each of the compositions is then added to the "doctor" boxes of a standard SMC machine where two separate layers of resin paste are spread on plastic film sheets, glass fiber rovings are chopped into fiber lengths of about 25 mm length and deposited on one of the supported layers of resin paste, sandwiched between the two layers of supported resin paste and then passed through kneading rollers which cause the fibers to be wet by the resin paste and dispersed therein. The completed sheet of SMC is then wound on a roll.

Each of the sheets of SMC prepared with compositions of this Example are found to have good to excellent wet-out of the chopped glass fibers.

EXAMPLE 2

Using the following proportion of ingredients, a series of resin paste formulations are prepared with a variety of aliphatic monocarboxylic acids:

| Component | Composition (parts by weight) |
|---|---|
| Polyester Resin | 39 |
| Low Profile Additive | 14 |
| Styrene | 47 |
| CaCO₃ | 150 |
| TBPB | 1 |
| Additive | 4 |

The polyester and low profile additive of Example 1 is used in the compositions of this Example. The method of Example 1 is used in preparing the compositions and in determining the viscosity of the various compositions.

Summarized in Table 2, below are the various additives employed in the compositions of this Example and the viscosities that are determined for the various compositions.

Table II

| Composition | Additive | Initial Viscosity (cps) | Viscosity 1 hr.@ RT(cps) | Comments |
|---|---|---|---|---|
| A | Zinc Stearate | 43,200 | 62,400 | 100% active |
| B | Stearic Acid | 22,400 | 25,100 | 100% active |
| C | Distilled Tall Oil | 27,200 | 40,000 | 100% active |
| D | Industrene 205 | 24,000 | 30,400 | mixture of 75% oleic 12% palmitic 7% linoleic 4% myristic 2% stearic |
| E | Linoleic Acid | 24,000 | 32,000 | 100% active |
| F | Oleic Acid | 20,800 | 27,200 | 100% active |
| G | Coconut Fatty Acid | 19,200 | 22,400 | 100% active |

EXAMPLE 3

Using the mixing procedure of Example 1, a series of resin paste formulations are prepared with the following proportion of ingredients with various low profile additives and viscosity reducing agents:

| Component | Composition (parts by weight) | | | | | | | | | | |
|---|---|---|---|---|---|---|---|---|---|---|---|
|  | A | B | C | D | E | F | G | H | I | J | K |
| Polyester Resin | 39 | 39 | 39 | 39 | 39 | 39 | 39 | 39 | 39 | 39 | 39 |
| Low Profile Additive |  |  |  |  |  |  |  |  |  |  |  |
| A | 11 | 11 | 11 |  |  |  |  |  |  |  |  |
| B |  |  |  | 12 | 12 | 12 |  |  |  |  |  |
| C |  |  |  |  |  |  | 12 | 12 | 12 |  |  |
| D |  |  |  |  |  |  |  |  |  | 14 | 14 |
| Styrene | 50 | 50 | 50 | 49 | 49 | 49 | 49 | 49 | 49 | 47 | 47 |
| CaCO₃ | 150 | 150 | 150 | 150 | 150 | 150 | 150 | 150 | 150 | 150 | 150 |
| TBPB | 1 | 1 | 1 | 1 | 1 | 1 | 1 | 1 | 1 | 1 | 1 |
| Zinc Stearate | 4 | 2 | 2 | 4 | 2 | 2 | 4 | 2 | 2 | 4 | — |
| Oleic Acid | — | 2 | — | — | 2 | — | — | 2 | — | — | — |
| Stearic Acid | — | — | 2 | — | — | 2 | — | — | 2 | — | 4 |

The unsaturated polyester resin of Example 1 is used in the preparation of each of the compositions of this Example. Low Profile Additive A is a solution of polystyrene resin in styrene (35 percent by weight solids) available commercially under the trademark designation BAKELITE Low Profile Additive LP-80 from Union Carbide Corporation. Low Profile Additive B is a solution of carboxylated polycaprolactone in styrene (40 percent by weight solids) available commercially under the trademark designation BAKELITE Low Profile Additive LP-60 from Union Carbide Corporation. Low Profile Additive D is a solution of poly (vinyl acetate) in styrene available under the trademark designation BAKELITE Low Profile Additive 100 from Union Carbide Corporation.

The initial and 1 hour viscosities of each of the compositions of this Example are measured using the procedure of Example 1 and the result are summarized in Table III, below.

Table III

| Composition | Viscosity (cps) | |
|---|---|---|
| | Initial | After 1 hour |
| A | 22,400 | 28,800 |
| B | 10,900 | 15,000 |
| C | 80,000 | 99,200 |
| D | 11,800 | 11,600 |
| E | 6,400 | 8,000 |
| F | 9,600 | 9,600 |
| G | 27,500 | 32,500 |
| H | 19,000 | 21,000 |
| I | 20,000 | 22,500 |
| J | 34,900 | 51,200 |
| K | 16,000 | 22,400 |

EXAMPLE 4

This Example compares the viscosity of resin paste formulations prepared with various types of metal stearate mold release agents and stearic acid. The following proportion of ingredients is used to prepare the compositions:

| Components | Compositions (parts by weight) | | | |
|---|---|---|---|---|
| | A | B | C | D |
| Polyester Resin | 36 | 36 | 36 | 36 |
| Low Profile Additive | 14 | 14 | 14 | 14 |
| Styrene | 50 | 50 | 50 | 50 |
| CaCO$_3$ | 150 | 150 | 150 | 150 |
| TBPB | 1 | 1 | 1 | 1 |
| Zinc Stearate | 4 | — | — | — |
| Calcium Stearate | — | 4 | — | — |
| Magnesium Stearate | — | — | 4 | — |
| Stearic Acid | — | — | — | 4 |

The Low Profile Additive of Example I was used in the compositions of this Example. The polyester resin is an orthophthalic modified—maleic anhydride/propylene glycol unsaturated polyester resin available under the trade designation GR-13031 from Hatco Division, W. R. Grace & Co.

The mixing procedures of Example 1 are used in preparing the compositions, and viscosity measurements are made as described in Example 1. Summarized in table IV, below are viscosity measurements for each of the compositions of this Example:

Table IV

| Composition | Initial Viscosity (cps) | Viscosity after 1 hour (cps) |
|---|---|---|
| A | 46,400 | 73,900 |
| B | 53,500 | 75,200 |
| C | 65,300 | 106,600 |
| D | 23,000 | 28,500 |

Composition D exhibits a substantially lower viscosity than either of Compositions A, B, or C prepared with metal stearate compounds.

EXAMPLE 5.

This example compares the viscosity of resin paste compositions prepared with reduced amounts of zinc stearate and similar compositions containing a viscosity reducing agent. The following proportion of ingredients are employed in preparing paste compositions of this Example:

| Component | Composition (parts by weight) | | | | | |
|---|---|---|---|---|---|---|
| | A | B | C | D | E | F |
| Polyester Resin | 39 | 39 | 39 | 39 | 39 | 39 |
| Low Profile Additive | 12 | 12 | 12 | 14 | 12 | 14 |
| Styrene | 49 | 49 | 49 | 47 | 49 | 47 |
| CaCO$_3$ | 150 | 150 | 150 | 150 | 150 | 150 |
| TBPB | 1 | 1 | 1 | 1 | 1 | 1 |
| Zinc Stearate | 4 | 3 | 2 | 2 | 1 | — |
| Stearic Acid | — | — | — | 2 | — | 4 |

The polyester resin and low profile additive of Example 1 is used in this Example. The mixing and viscosity testing procedures of Example I are also used. The viscosities of each of the compositions are summarized in Table V, below.

TABLE V

| Compositions | Zinc Stearate (pts. by wt.) | Stearic Acid (pts. by wt.) | Initial Viscosity, cps (90° F.) | Viscosity after one Hour (RT) |
|---|---|---|---|---|
| A | 4 | 0 | 32,000 | 48,000 |
| B | 3 | 0 | 28,800 | 41,600 |
| C | 2 | 0 | 27,200 | 38,400 |
| D | 2 | 2 | 25,000 | 29,800 |
| E | 1 | 0 | 25,600 | 33,600 |
| F | 0 | 4 | 19,000 | 21,800 |

The results reported show that paste compositions with smaller amounts of zinc stearate exhibit lower viscosity properties but that such composition containing a viscosity reducing agent exhibit even lower viscosity properties.

EXAMPLE 6

The following series of resin paste compositions are prepared:

| Component | Compositions (parts by weight) | | | | | |
|---|---|---|---|---|---|---|
| | A | B | C | D | E | F |
| Polyester Resin | 39 | 39 | 39 | 39 | 39 | 39 |
| Low Profile Additive | 12 | 12 | 12 | 12 | 12 | 12 |
| Styrene | 49 | 49 | 49 | 49 | 49 | 49 |
| CaCO$_3$ | 180 | 180 | 180 | 180 | 180 | 180 |
| TBPB | 1 | 1 | 1 | 1 | 1 | 1 |
| Zinc Stearate | 4 | 3.8 | 3.6 | 3.4 | 3 | 2 |
| Stearic Acid | — | 0.2 | 0.4 | 0.6 | 1 | 2 |

The polyester resin, low profile additive and mixing procedures of Example 1 are used in preparing the compositions. Viscosity measurements are made as described in Example 1, and the results thereof are summarized in Table VI, below.

Table VI

| Composition | Initial Viscosity, (cps) 90° F. | Viscosity After 1 hour, (cps) RT |
|---|---|---|
| A | 46,400 | 72,090 |
| B | 46,400 | 68,800 |
| C | 43,200 | 64,000 |
| D | 40,000 | 57,600 |
| E | 33,600 | 57,200 |
| F | 32,000 | 48,000 |

EXAMPLE 7

SMC having the following proportion of ingredients are prepared:

| Component | Composition (parts by weight) | | | | |
|---|---|---|---|---|---|
| | A | B | C | D | E |
| Polyester Resin A | 36 | 36 | 39 | — | — |
| Polyester Resin B | — | — | — | 39 | 39 |
| Low Profile Additive | 16 | 16 | 14 | 14 | 14 |
| Styrene | 48 | 48 | 47 | 47 | 47 |
| Glass Beads | — | — | 23 | — | — |
| $CaCO_3$ | 150 | 150 | 77 | 180 | 180 |
| TBPB | 1.5 | 1.5 | 1.1 | 1 | 1 |
| Zinc Stearate | 4 | 2 | 2 | 4 | 2 |
| Stearic Acid | — | 2 | 2 | — | 2 |
| MgO | — | — | — | 3.0 | 3.0 |
| $Mg(OH)_2$ | 2.1 | 2.7 | 2.7 | — | — |
| $Ca(OH)_2$ | 0.7 | 0.9 | 0.9 | — | — |
| glass fibers | 27.2 | 28.1 | 30.4 | 25.6 | 28.5 |

Polyester resin A is an unsaturated resin commercially available under the trade designation NR-3929 from Rockwell International. Polyester resin B and the low profile additive are the same as employed in Example 1. The mixing procedures of Example 1 are used to prepare the SMC of this Example. The glass beads filler used in composition C is available under trademark designation Glass Beads B 37-2000 from 3M Company. The initial viscosities of each of the compositions are measured for the resin paste prior to incorporating glass fiber fillers and the results are summarized in Table VII, below.

Table VII

| Composition | Initial Viscosity (cps) @ 90° F. |
|---|---|
| A | 64,000 |
| B | 38,400 |
| C | 32,000 |
| D | 76,800 |
| E | 43,200 |

Each of the SMC of the Examples are used to prepare molded parts that are cured at 150° C. for about 3 minutes. Each of the molded parts are satisfactorily released from the molds after curing.

Parts molded from compositions A, B, D and E are tested for paint adhesion with satisfactory results being obtained.

EXAMPLE 8

The following resin paste compositions are prepared:

| Components | Compositions (parts by weight) | | |
|---|---|---|---|
| | A | B | C |
| Thermosetting Resin | 40 | 40 | 40 |
| Low profile additive | 14 | 14 | 14 |
| Styrene | 46 | 46 | 46 |
| $CaCO_3$ | 150 | 150 | 150 |
| Zinc stearate | 4 | — | — |
| Stearic acid | — | 4 | — |
| Oleic acid | — | — | 4 |

The thermosetting resin used in this Example is a terminally unsaturated vinyl ester resin available under the trademark designation DERAKANE 7608.05 from Dow Chemical Co. The low profile additive of Example 1 is also used. Viscosity measurements made for each of the compositions are summarized in Table VIII below.

| Composition | Initial Viscosity (cps) 90° F. | Viscosity after 1 hr. at RT |
|---|---|---|
| A | 28,000 | 60,000 |
| B | 20,000 | 32,000 |
| C | 20,000 | 36,000 |

EXAMPLE 9

The following compositions are prepared:

| Components | Composition (parts by weight) | | | | | | |
|---|---|---|---|---|---|---|---|
| | A | B | C | D | E | F | G |
| Polyester Resin A | 39 | 39 | — | — | — | — | — |
| Polyester Resin B | — | — | 40 | 40 | 40 | 40 | 40 |
| Low profile Additive A | 14 | 14 | — | — | — | — | — |
| Low profile Additive B | — | — | 12 | 12 | 11 | 11 | 11 |
| Styrene | 47 | 47 | 48 | 48 | 49 | 49 | 49 |
| $CaCO_3$ | — | — | — | — | 180 | 180 | 180 |
| Aluminum Trihydrate | 150 | 150 | 150 | 150 | — | — | — |
| TBPB | 1 | 1 | 1 | 1 | 1 | 1 | 1 |
| Zinc Stearate | 4 | — | 4 | — | 4 | — | — |
| Stearic acid | — | 4 | — | 4 | — | 4 | — |
| Oleic Acid | — | — | — | — | — | — | 4 |

Polyester resin A and low profile additive A are the same as the materials used in Example 1. Polyester resin B is an unsaturated polyester resin available commerically under the trade designation P-340 from Rohm and Haas. Low profile additive B is a methyl methacrylate/ethyl acrylate/acrylic acid terpolymer available under the trade designation P-701 from Rohm and Haas.

Viscosity measurements of each of the compositions of this Example are summarized in Table IX, below.

Table IX

| Composition | Initial Viscosity (cps) 90° F. | Viscosity (cps) after 1 hr. RT |
|---|---|---|
| A | 51,200 | 70,400 |
| B | 36,200 | 40,000 |
| C | 37,400 | 52,800 |
| D | 27,500 | 32,600 |
| E | 12,700 | 23,800 |
| F | 29,500 | 34,300 |
| G | 8,800 | 5,900 |

What is claimed is:

1. A curable molding composition of a mixture of a thermosetting resin which is an unsaturated polyester resin, a terminally unsaturated vinyl ester resin or mixtures thereof, an olefinically unsaturated copolyerizable monomer, a chemical thickening agent and a filler, said curable composition comprising a thermoplastic polymeric low profile additive selected from the group consisting of vinyl acetate polymers, saturated polyesters, and mixtures of the same, and at least about 0.4 percent by weight of a viscosity reducing agent based on the combined weight of thermosetting resin, plus copolymerizable monomer, plus low profile additive, said viscosity reducing agent comprising an aliphatic monocarboxylic acid having at least 6 carbon atoms in the chain.

2. The curable molding composition of claim 1 wherein said thermoplastic vinyl acetate polymer low profile additive is a member selected from the group consisting of vinyl acetate homopolymers, carboxylated vinyl acetate polymers, vinyl acetate copolymers containing at least 50 percent by weight vinyl acetate and mixture of the same.

3. The curable molding composition of claim 1 wherein said low profile additive is polyvinyl acetate.

4. The curable molding composition of claim 1 wherein said low profile additive is a carboxylated polyvinyl acetate having at least one carboxyl group per molecule.

5. The curable molding composition of claim 1 wherein said thermoplastic saturated polyester low profile additive is a member selected from the group consisting of saturated polymers of polymerizable linear esters, saturated polymers of polymerizable cyclic esters and mixtures of the same.

6. The curable molding composition of claim 5 wherein said thermoplastic saturated polyester low profile additive is a carboxylated saturated polyester having at least one carboxyl group per molecule.

7. The curable molding composition of claim 1 wherein said low profile additive is a thermoplastic saturated polymer of cyclic esters.

8. The curable molding composition of claim 7 wherein said low profile additive is a carboxylated saturated polymer of cyclic esters having at least one carboxyl group per molecule.

9. The curable molding composition of claim 1 wherein said viscosity reducing agent is selected from the group consisting of saturated and unsaturated fatty acids and mixtures of the same.

10. A curable molding composition of a mixture of a thermosetting resin which is an unsaturated polyester resin, a terminally unsaturated vinyl ester resin or mixtures thereof, an olefinically unsaturated copolymerizable monomer, a chemical thickening agent and a filler, said curable composition comprising a thermoplastic polymeric low profile additive selected from the group consisting of polyalkyl acrylates and methacrylates and mixtures of the same and at least about 0.4 percent by weight of a viscosity reducing agent based on the combined weight of thermosetting resin, plus copolymerizable monomer, plus low profile additive, said viscosity reducing agent being an unsaturated aliphatic monocarboxylic acid having at least 6 carbon atoms in the chain.

11. A curable molding composition of a mixture of a thermosetting resin which is an unsaturated polyester resin, a terminally unsaturated vinyl ester resin or mixtures thereof, an olefinically unsaturated copolymerizable monomer, a chemical thickening agent and an alumina trihydrate filler, said curable composition comprising a thermoplastic polymeric low profile additive selected from the group consisting of polyalkyl acrylates and methacrylates and mixtures of the same and at least about 0.4 percent by weight of a viscosity reducing agent based on the combined weight of thermosetting resin, plus copolymerizable monomer, plus low profile additive, said viscosity reducing agent comprising an aliphatic monocarboxylic acid having at least 6 carbon atoms in the chain.

12. A curable molding composition comprising: (a) a thermosetting resin which is a member selected from the group consisting of an unsaturated polyester resin, a terminally unsaturated vinyl ester resin and mixtures of the same; (b) an olefinically unsaturated copolymerizable monomer; (c) a filler; (d) a thermoplastic polymeric low profile additive selected from the group consisting of vinyl acetate polymers, saturated polyesters, and mixtures of the same; and (3) at least about 0.4 percent by weight of a viscosity reducing agent based on the combined weight of thermosetting resin plus copolymerizable monomer plus low profile additive said viscosity reducing agent comprising an aliphatic monocarboxylic acid having at least 6 carbon atoms in the chain.

13. The curable molding composition of claim 12 wherein said thermosetting resin is an unsaturated polyester resin.

14. The curable molding composition of claim 12 wherein said viscosity reducing agent is a fatty acid.

15. A method of preparing a low shrink curable molding composition having reduced initial viscosity from a mixture comprising a thermosetting resin which is an unsaturated polyester resin, a terminally unsaturated vinyl ester resin or mixtures thereof, an olefinically unsaturated copolymerizable monomer, and a filler, said process comprising incorporating in said resin mixture a thermoplastic polymeric low profile additive selected from the group consisting of vinyl acetate polymers, saturated polyesters and mixtures thereof and at least about 0.4 percent by weight of a viscosity reducing agent comprising an aliphatic monocarboxylic acid having at least 6 carbon atoms, based on the weight of thermosetting resin plus monomer plus low profile additive.

16. The method of preparing low shrink molding compositions as defined in claim 15 wherein said low profile additive is selected from the group consisting of vinyl acetate polymers, carboxylated vinyl acetate polymers having at least one carboxyl group per molecule, and mixtures thereof.

17. The method as defined in claim 15 wherein said low profile additive is selected from the group consisting of saturated polymers of cyclic esters, saturated carboxylated polymers of cyclic esters and mixtures thereof.

18. The method as defined in claim 15 wherein said viscosity reducing agent is a fatty acid.

* * * * *